(12) United States Patent
Ji (10) Patent No.: US 12,283,019 B2
(45) Date of Patent: Apr. 22, 2025

(54) METHOD AND APPARATUS FOR DISPLAYING VIRTUAL CARD, COMPUTER DEVICE, AND STORAGE MEDIUM

(71) Applicant: SHANGHAI BILIBILI TECHNOLOGY CO., LTD., Shanghai (CN)

(72) Inventor: Yunjie Ji, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/024,941

(22) PCT Filed: Aug. 11, 2021

(86) PCT No.: PCT/CN2021/112147
§ 371 (c)(1),
(2) Date: Mar. 6, 2023

(87) PCT Pub. No.: WO2022/052729
PCT Pub. Date: Mar. 17, 2022

(65) Prior Publication Data
US 2023/0326156 A1    Oct. 12, 2023

(30) Foreign Application Priority Data
Sep. 8, 2020    (CN) .......................... 202010935831.3

(51) Int. Cl.
*G06T 19/20* (2011.01)
*G06F 3/0346* (2013.01)
(52) U.S. Cl.
CPC ............ *G06T 19/20* (2013.01); *G06F 3/0346* (2013.01); *G06T 2219/2016* (2013.01)

(58) Field of Classification Search
CPC .. G06F 3/04815; G06F 3/0346; G06F 3/0483; G06F 3/04845; G06F 1/1694;
(Continued)

(56) References Cited

U.S. PATENT DOCUMENTS

2012/0242664 A1    9/2012    Athans et al.
2013/0321391 A1    12/2013   Troy et al.
2015/0212710 A1    7/2015    Gupta et al.

FOREIGN PATENT DOCUMENTS

CA        2814448 A1 *  11/2013    ........... G06F 3/0482
CN     102541530 A       7/2012
(Continued)

OTHER PUBLICATIONS

Machined English Translation for CN 111583375 A; Feb. 16, 2024; pp. 1-13 (Year: 2024).*

(Continued)

Primary Examiner — Jimmy H Nguyen
(74) Attorney, Agent, or Firm — BakerHostetler (57) ABSTRACT

Techniques for displaying a virtual card are provided. The techniques comprise obtaining a first card face pattern, a first initial parameter, and a first association relationship corresponding to the virtual card, wherein the first initial parameter represents an initial parameter of a first display feature of a first material, and the first association relationship represents a rule by which a real-time parameter of the first display feature changes as a change of a parameter associated with a sensor in a mobile client device happens; displaying the first material in the virtual card based on the first initial parameter; detecting in real time the parameter associated with the sensor, and determining the real-time parameter of the first display feature based on the first association relationship and the parameter; and displaying (Continued)

the first material in the virtual card based on the real-time parameter of the first display feature.

20 Claims, 7 Drawing Sheets

(58) Field of Classification Search
CPC .......... G06F 2203/04802; G06T 19/20; G06T 2219/2016
USPC ........................................................ 345/156
See application file for complete search history.

(56) References Cited

FOREIGN PATENT DOCUMENTS

| | | | |
|---|---|---|---|
| CN | 103135889 | A | 6/2013 |
| CN | 103970421 | A | 8/2014 |
| CN | 106104602 | A | 11/2016 |
| CN | 106155474 | A | 11/2016 |
| CN | 106406532 | A | 2/2017 |
| CN | 108510036 | A | 9/2018 |
| CN | 109101120 | A | 12/2018 |
| CN | 109558243 | A | 4/2019 |
| CN | 109603151 | A | 4/2019 |
| CN | 109697003 | A | 4/2019 |
| CN | 111583375 | A | 8/2020 |
| CN | 112416218 | A | 2/2021 |
| WO | WO 2012/021589 | A1 | 2/2012 |

OTHER PUBLICATIONS

Machined English Translation for CN 106104602 A; Feb. 18, 2024; pp. 1-15 (Year: 2024).*
International Patent Application No. PCT/CN2021/112147; Search Report; dated Nov. 12, 2021; 2 pages.

* cited by examiner

METHOD AND APPARATUS FOR DISPLAYING VIRTUAL CARD, COMPUTER DEVICE, AND STORAGE MEDIUM

CROSS-REFERENCE TO RELATED APPLICATIONS

This disclosure is the U.S. National Stage of International Application No. PCT/CN2021/112147, filed on Aug. 11, 2021, which claims priority to Chinese Patent Application No. 202010935831.3, filed on Sep. 8, 2020, both of which are incorporated herein by reference in their entireties.

TECHNICAL FIELD

This disclosure relates to the field of data interaction and display technologies, and in particular, to a method and an apparatus for displaying a virtual card, a computer device, and a storage medium.

BACKGROUND

To improve user stickiness, increasingly more paid websites have launched virtual card services. A user can have more rights and interests if the user recharges or registers for a virtual card. For example, within a validity period of the card, the user can read electronic books and watches films and television programs without limit.

Currently, most of existing virtual cards are displayed in a form of static pictures. Consequently, there is a lack of realism in a display effect, and effective interaction with the user cannot be performed.

SUMMARY

This disclosure provides a virtual card display solution that can improve data interaction and data display efficiency, to resolve the foregoing problem existing in the prior art.

According to an aspect of this disclosure, a method for displaying a virtual card is provided, and includes: obtaining a first card face pattern, a first initial parameter, and a first association relationship corresponding to the virtual card, where the first initial parameter is used to represent an initial parameter of a first display feature of a first material corresponding to the first card face pattern, and the first association relationship is used to represent a rule in which a real-time parameter of the first display feature changes with a sensor parameter in a mobile client device; displaying the first material in the virtual card based on the first initial parameter; collecting the sensor parameter in the mobile client device in real time, and determining the real-time parameter of the first display feature based on the sensor parameter and the first association relationship; and displaying the first material in the virtual card based on the real-time parameter of the first display feature.

According to another aspect of this disclosure, a method for displaying a virtual card is provided, and includes: receiving a card face material group corresponding to the virtual card, where the card face material group includes one or more materials; receiving an initial parameter and an association relationship corresponding to each material, where the initial parameter is used to represent an initial parameter of a display feature of the material, and the association relationship is used to represent a rule in which a real-time parameter of the display feature changes with a sensor parameter in a mobile client device; and generating and storing a card face pattern corresponding to the card face material group based on initial parameters of all materials included in the card face material group.

According to another aspect of this disclosure, an apparatus for displaying a virtual card is provided, and includes: an initial obtaining module, configured to obtain a first card face pattern, a first initial parameter, and a first association relationship corresponding to the virtual card, where the first initial parameter is used to represent an initial parameter of a first display feature of a first material corresponding to the first card face pattern, and the first association relationship is used to represent a rule in which a real-time parameter of the first display feature changes with a sensor parameter in a mobile client device; an initial display module, configured to display the first material in the virtual card based on the first initial parameter; a real-time collection module, configured to: collect the sensor parameter in the mobile client device in real time, and determine the real-time parameter of the first display feature based on the sensor parameter and the first association relationship; and a real-time display module, configured to display the first material in the virtual card based on the real-time parameter of the first display feature.

According to another aspect of this disclosure, an apparatus for displaying a virtual card is provided, and includes: a material receiving module, configured to receive a card face material group corresponding to the virtual card, where the card face material group includes one or more materials; a parameter receiving module, configured to receive an initial parameter and an association relationship corresponding to each material, where the initial parameter is used to represent an initial parameter of a display feature of the material, and the association relationship is used to represent a rule in which a real-time parameter of the display feature changes with a sensor parameter in a mobile client device; and a card face generation module, configured to generate and store a card face pattern corresponding to the card face material group based on initial parameters of all materials included in the card face material group.

According to another aspect of this disclosure, a computer device is provided, and includes a memory, a processor, and a computer program that is stored in the memory and that can run on the processor. When the processor executes the computer program, the foregoing method is implemented.

According to another aspect of this disclosure, a computer-readable storage medium is provided. The computer-readable storage medium stores a computer program, and when the computer program is executed by a processor, the foregoing method is implemented.

According to another aspect of this disclosure, a computer program product is provided, and includes a computer program. When the computer program is executed by a processor, the foregoing method is implemented.

According to the method and the apparatus for displaying a virtual card, the computer device, and the computer-readable storage medium provided in this disclosure, the display feature of the virtual card is associated with the real-time sensor parameter collected by the mobile client device, and different display effects are presented based on a change in the sensor parameter.

Specifically, in this disclosure, a material resource in the virtual card is associated with a plurality of sensors such as an acceleration sensor, a brightness sensor, and a gravity sensor in a mobile device, so that the virtual card can subtly change with a parameter such as a device angle or ambient light in real time in the mobile device. Therefore, display efficiency and a display effect of the virtual card can be improved, so that the virtual card has texture similar to that of a real card. In addition, real-time interaction with a user can be performed, to enhance attractiveness to the user.

DESCRIPTION OF EMBODIMENTS

To make the objectives, technical solutions, and advantages of this disclosure more clearly, this disclosure is further described below in detail with reference to the accompanying drawings and embodiments. It should be understood that the specific embodiments described herein are merely intended to explain this disclosure, and are not intended to limit this disclosure. All other embodiments obtained by a person of ordinary skill in the art based on the embodiments in this disclosure without creative efforts shall fall within the protection scope of this disclosure.

Figure 1:
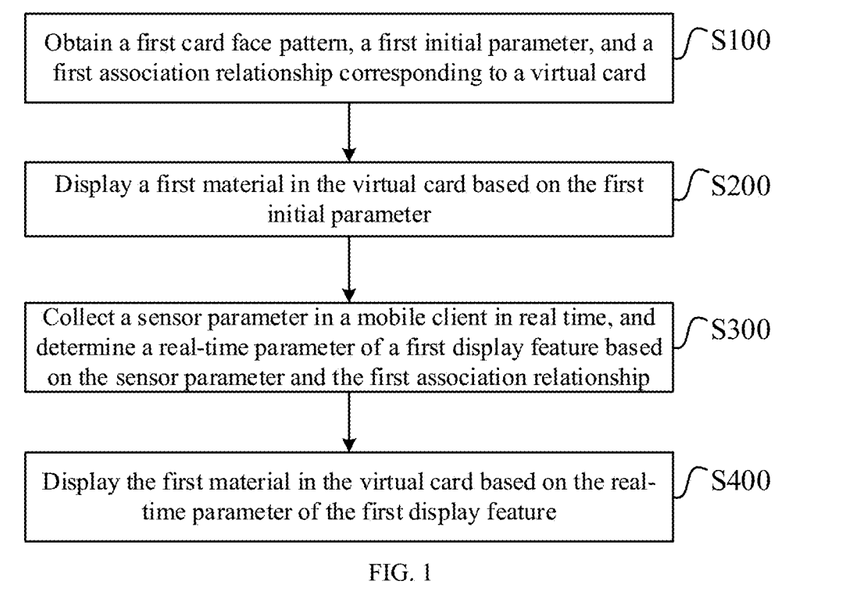
FIG. 1 is a flowchart of a method for displaying a virtual card according to an embodiment of this disclosure.

Referring to FIG. 1, an embodiment of this disclosure provides a method for displaying a virtual card. The method may be performed in a mobile client device (in other words, the method is performed by the mobile client device or a part of the mobile client device), and includes the following steps.

S100: Obtain a first card face pattern, a first initial parameter, and a first association relationship corresponding to the virtual card.

According to some embodiments, in step S100, the first card face pattern, the first initial parameter, and the first association relationship corresponding to the virtual card may be downloaded from a server computing system, i.e., server, in response to information about the virtual card activated by a user. The first card face pattern may be, for example, selected by the user or may be a default card face pattern.

The information about the virtual card activated by the user may be determined when the user logs in to an account through the mobile client device. For example, the user enters the account and a password on the mobile client device to request login from the server. After verifying the account and the password, the server may query whether the user purchased the virtual card. If the user purchased the virtual card, the information about the virtual card activated by the user is returned to the client. The virtual card in this embodiment may include one or more materials, for example, pictures, videos, or 3D models. Usually, the virtual card includes a rectangular display box. The display box may include one or a combination of a plurality of the foregoing materials such as the pictures, the videos, or the 3D models. Change to different materials or different material combinations is implemented, so that the virtual card can present different content. The different content may be represented by using different card face patterns. It may be understood that the virtual card may include a plurality of different card face patterns for selection by the user based on a preference. When the user logs in to the account, the server may find the first card face pattern last selected by the user, the first initial parameter, and the first association relationship, and send the first card face pattern, the first initial parameter, and the first association relationship to the mobile client device. Alternatively, when the user has never selected a card face pattern, the server may use a default card face pattern as the first card face pattern, and send the first card face pattern, the first initial parameter, and the first association relationship to the mobile client device.

The card face pattern may be, for example, an image in a format of .jpg, .bmp, or the like, and may be specifically obtained by capturing a screenshot of a virtual card that includes one or more materials, to provide a visual index for the user.

The initial parameter is used to represent an initial parameter of a display feature of a material corresponding to the card face pattern. When the card face pattern includes a plurality of materials, for example, includes both a material 1 and a material 2, the initial parameter is an initial parameter of a display feature corresponding to each material, for example, an initial parameter of a display feature corresponding to the material 1 and an initial parameter of a display feature corresponding to the material 2. The display feature in this embodiment may include one or more of position coordinates, a size, transparency, a rotation angle, a flip angle, and a time axis. The position coordinates are used to represent a relative position of the corresponding material in a card face area, and the size is used to represent a relative size of the corresponding material in the card face area. The card face area in this embodiment may be a preset rectangular box with a specific length and width. An upper left corner of the card face area may be used as an origin of plane coordinates, and coordinates of a central point of the corresponding material in the card face area may represent the relative position of the material in the card face area. Similarly, the size of the corresponding material may represent the relative size of the material in the card face area. The transparency is used to represent transparency of the corresponding material, the rotation angle is used to represent an offset angle of the corresponding material on a plane parallel to a display screen of the mobile client device, and the flip angle is used to represent an offset angle of the corresponding material relative to a plane on which the display screen of the mobile client device is located. The time axis is a feature specific to a video material, and represents a relative moment of a current play frame in the corresponding video material in an entire video.

An initial parameter of each display feature in this embodiment may be preset by a designer. For example, for a specific material, it is set that initial coordinates are located in a center of the card face area, initial transparency is 0 (in other words, the material is completely opaque), and both an initial rotation angle and an initial flip angle are 0 degrees.

The association relationship in this embodiment is used to represent a rule in which a real-time parameter of the display feature changes with a sensor parameter in the mobile client device. It may be understood that the mobile client device such as a smartphone usually includes one or more of an angular velocity sensor (which is also referred to as a "gyroscope"), a gravity sensor, a brightness sensor, a barometric pressure sensor, and a geolocation sensor. Certainly, this disclosure is not limited thereto. The mobile client device such as a smartphone may further include any other suitable type of sensor.

Correspondingly, the sensor parameter may include one or more of an angular velocity sensor parameter (for example, a tilt angle of the mobile client device collected by the angular velocity sensor), a gravity sensor parameter (for example, an angle of the mobile client device collected by the gravity sensor in a horizontal direction, a vertical direction, or in another direction), a brightness sensor parameter (for example, brightness that is of an environment in which the mobile client device is located and that is collected by the brightness sensor), a barometric pressure sensor parameter (for example, an altitude at which the mobile client device is located and that is collected by the barometric pressure sensor), and any other suitable type of sensor parameter. It may be understood that there is a correspondence between barometric pressure and the altitude, and a higher altitude indicates lower barometric pressure. Therefore, the barometric pressure sensor may be used to measure the altitude. In some embodiments, the altitude may be alternatively determined by using a combination of the barometric pressure sensor and the geolocation sensor (for example, a GPS sensor).

The rule in which the real-time parameter of the display feature changes with the sensor parameter is set, so that the virtual card can present different display states in real time based on different actions or different environments of the mobile client device, to increase the interactivity and fun. It should be noted that each display feature in this embodiment of this disclosure may be associated with only one sensor parameter, or may be associated with a plurality of sensor parameters. According to some embodiments, each display feature may be associated with only one unique sensor parameter. In this way, mutual exclusion caused because the display feature is associated with a plurality of sensor parameters can be avoided. Specifically, a sensor parameter associated with any display feature may be set based on a requirement. Specific examples are as follows:

A correspondence between a variation range of the coordinates and a variation range of the angular velocity sensor parameter or a variation range of the gravity sensor parameter is set.

A correspondence between a variation range of the size and the variation range of the angular velocity sensor parameter, a variation range of the brightness sensor parameter, or the variation range of the gravity sensor parameter is set.

A correspondence between a variation range of the transparency and the variation range of the angular velocity sensor parameter, the variation range of the brightness sensor parameter, the variation range of the gravity sensor parameter, or a variation range of the barometric pressure sensor parameter is set.

A correspondence between a variation range of the rotation angle and the variation range of the gravity sensor parameter is set.

A correspondence between a variation range of the flip angle and the variation range of the angular velocity sensor parameter is set.

A correspondence between a variation range of the time axis and the variation range of the angular velocity sensor parameter is set.

It may be understood by a person of ordinary skill in the art that setting of the foregoing association relationships is merely used as an example, and is not used as a limitation on this disclosure. Any existing or further possible association relationships between the display feature and the sensor shall fall within the protection scope of this disclosure.

According to some other embodiments, the mobile client device may pre-obtain and pre-store the first card face pattern, the first initial parameter, and the first association relationship of the virtual card before step S100. Correspondingly, in step S100, the mobile client device may locally obtain the first card face pattern, the first initial parameter, and the first association relationship.

S200: Display a first material in the virtual card based on the first initial parameter.

At the beginning of loading the virtual card, the mobile client device first presents the display feature of each material based on the initial parameter. A specific presentation time may be flexibly set based on a requirement, for example, 10 seconds. In this way, the user can understand a display effect of the virtual card. It should be noted that an effect of the virtual card presented based on the initial parameter may be the same as or different from an effect displayed in the card face pattern. As described above, the card face pattern is actually a screenshot of a static presentation effect of the display feature of the virtual card under a specific condition. The specific condition may be an initial moment or a limit condition, for example, a display feature corresponding to a case in which the sensor parameter is an end point of the variation range.

S300: Collect the sensor parameter in the mobile client device in real time, and determine a real-time parameter of a first display feature based on the sensor parameter and the first association relationship.

It may be understood that when the user holds the mobile client device, the mobile client device is not in a static state for a long time, and an angle, a position, and a surrounding environment of the mobile client device change in real time. The display feature of the virtual card is adjusted in real time based on the sensor parameter in the mobile client device, so that the display effect of the virtual card can change with a status of the mobile client device.

As described above, the association relationship is used to represent the rule in which the real-time parameter of the display feature changes with the sensor parameter in the mobile client device, for example, a correspondence between a variation range of a specific display feature and a variation range of a sensor parameter. Specifically, when receiving the foregoing correspondence from the server, the mobile client device calculates a real-time value of the display feature based on the correspondence. For example, when the tilt angle collected by the angular velocity sensor changes within [−60°, 60°], the flip angle may change within [−30°, 30°]. The mobile client device may calculate a linear relationship between the flip angle and the tilt angle based on the variation ranges. For example, $30=m \times 60$, and $m=30 \div 60=0.5$, that is, a correspondence between the flip angle $\theta$ and the tilt angle a is $\theta=0.5a$. Therefore, a corresponding flip angle $\theta$ may be calculated based on each tilt angle a collected by the angular velocity sensor.

Herein, one sensor parameter may correspond to a plurality of different first display features, that is, when a sensor parameter changes, real-time parameters of a plurality of different first display features change. For example, when the angular velocity sensor changes, both a flip angle and transparency of the first material change.

According to some embodiments, there are a plurality of first materials, that is, the first card face pattern corresponds to a plurality of first materials.

When the first card face pattern corresponds to a plurality of first materials, according to some embodiments, the step of determining a real-time parameter of the first display feature may include:

determining the real-time parameter of the first display feature based on the sensor parameter, the first association relationship, and a quantity of the plurality of first materials. According to some embodiments, a sum of real-time parameters of first display features of the plurality of first materials may be determined based on the sensor parameter and the first association relationship; and a real-time parameter of a first display feature of each of the plurality of first materials may be set to a quotient of the sum of the real-time parameters and the quantity of the plurality of first materials. For example, the first card face pattern includes n first materials. When the real-time parameter of the first display feature is determined, the quantity n of the first materials is also taken into account, so that the real-time parameter of the first display feature corresponding to each first material accounts for 1/n of the real-time parameters (namely, the sum of the real-time parameters) of all the first display features. For example, when a mobile phone is flipped based on the angular velocity sensor, if a card face includes only one material, the flip angle of the first material is 30 degrees. If the card face includes three materials, a flip angle of each material is ⅓ of the overall flip angle, namely, 30 degrees, in other words, the flip angle of each first material is 10 degrees.

When the first card face pattern corresponds to a plurality of first materials, according to some other embodiments, a real-time parameter of a first display feature of each of the plurality of first materials may be alternatively determined based on the sensor parameter, the first association relationship, and attributes of the plurality of first materials. The attribute of the first material includes but is not limited to a background image, a foreground image, and a content category (for example, a portrait, a plant, an animal, or a scene) of the first material. According to some embodiments, the first association relationship may be further used to represent a rule in which the real-time parameter of the first display feature changes with the sensor parameter and the attribute of the first material, and different attributes of the first material corresponding to different real-time parameters of the first display feature. For example, when the first material is a foreground image (for example, a portrait), the real-time parameter of the first display feature is the original parameter, namely, 30 degrees. When the first material is a background image, the real-time parameter of the first display feature is appropriately reduced based on the original parameter, for example, to ⅓, namely, 10 degrees, of the original parameter. In conclusion, for one sensor parameter, in this embodiment, there may be different real-time parameters of the first display feature in different scenarios. Therefore, richness of pictures of the virtual card can be increased, and user experience can be improved.

S400: Display the first material in the virtual card based on the real-time parameter of the first display feature.

Figure 2A:
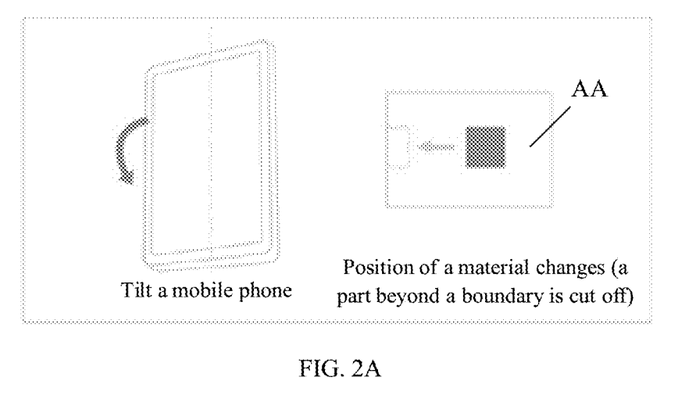
FIGS. 2A, 2B, 2C, and FIG. 2D are a schematic diagram of an effect in which a display feature changes with a sensor parameter according to an embodiment of this disclosure.
Figure 2B:
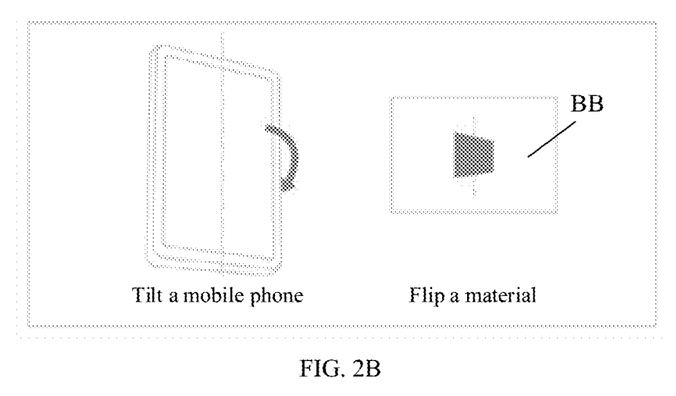
Figure 2C:
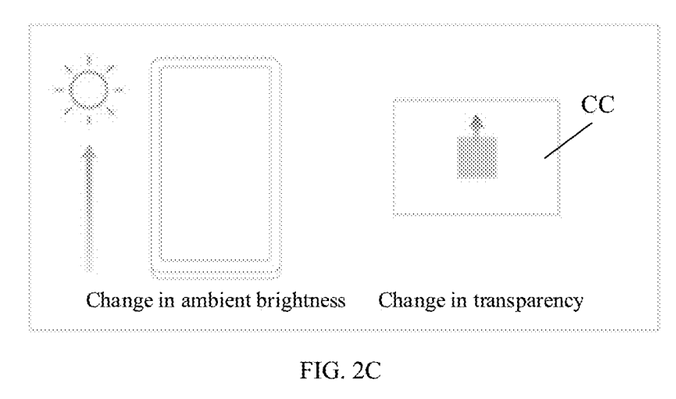
Figure 2D:
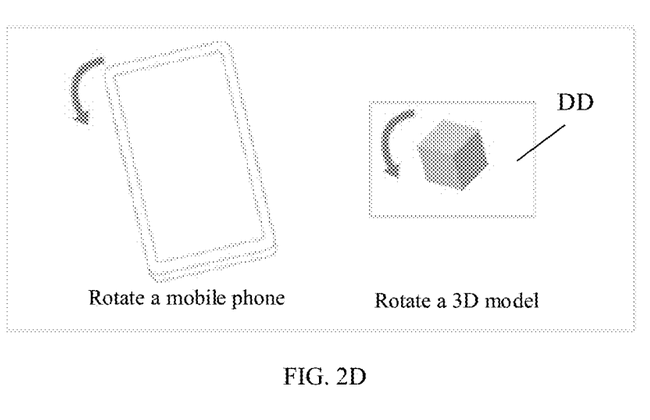

FIG. 2A to FIG. 2D are a schematic diagram of an effect in which a display feature changes with a sensor parameter according to some embodiments of this disclosure. FIG. 2A shows impact of a change in the angular velocity sensor parameter on coordinates of a material. As shown in a left figure in FIG. 2A, it is detected that the angular velocity sensor is tilted to the left based on a y axis, and in a corresponding right figure, the coordinates of the material in a rectangular display box AA of a virtual card move to the left. FIG. 2B shows impact of a change in the angular velocity sensor parameter on a flip angle of a material. As shown in a left figure in FIG. 2B, it is detected that the angular velocity sensor is tilted to the right based on a y axis, and in a corresponding right figure, the flip angle of the material in a rectangular display box BB of a virtual card changes towards a right side. FIG. 2C shows impact of a change in the brightness sensor parameter on transparency of a material. As shown in a left figure in FIG. 2C, it is detected that a brightness parameter of the brightness sensor changes from small to large, and in a corresponding right figure, transparency of the material in a rectangular display box CC of a virtual card changes from low to high. FIG. 2D shows impact that is of a change in the gravity sensor parameter on a rotation angle of a material and that exists when the first material is a 3D model. As shown in a left figure in FIG. 2D, it is detected that a rotation parameter of the gravity sensor is rotated counterclockwise, and in a corresponding right figure, the 3D model in a rectangular display box DD of a virtual card is also rotated counterclockwise.

According to some embodiments, the method for displaying a virtual card in this embodiment of this disclosure further includes the following steps S500 to S900 (S500 to S900 are not shown in FIG. 1).

S500: Send a card face pattern change request to the server.

To meet a personalized requirement of the user, this embodiment may include a plurality of card face patterns, and each card face pattern corresponds to a different material or material set. The user may send the card face pattern change request to the server through the mobile client device based on the current card face pattern.

S600: Receive a plurality of candidate card face patterns that correspond to the virtual card and that are returned by the server, and determine a second card face pattern from the plurality of candidate card face patterns.

Figure 3:
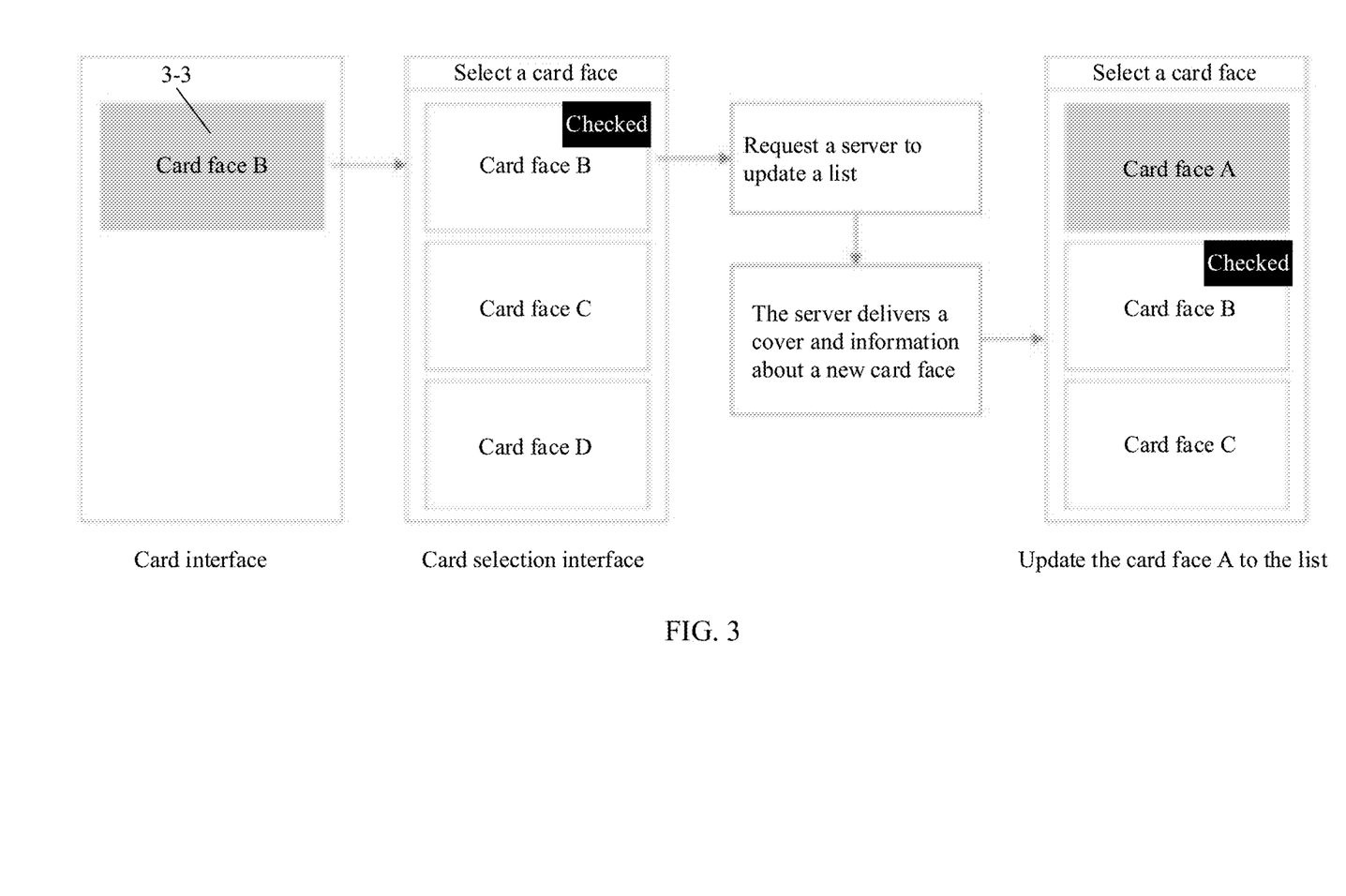
FIG. 3 is a schematic diagram of changing a card face pattern according to an embodiment of this disclosure.

Based on content requested by the mobile client device, the server returns the plurality of candidate card face patterns for selection by the user. FIG. 3 is a schematic diagram of changing a card face pattern according to an embodiment of this disclosure. As shown in FIG. 3, the first card face pattern 3-3 last selected by the user is a card face B. After the user logs in to a system and is verified, the mobile client device first downloads data such as a card face pattern, an initial parameter, and an association relationship related to the card face B. After the card face pattern change request is sent, the plurality of candidate card face patterns, for example, a card face A, the card face B, a card face C, and a card face D, returned by the server may be received. In the example in FIG. 3, the card face A is the determined second card face pattern.

S700: Receive a second initial parameter and a second association relationship that correspond to the second card face pattern and that are returned by the server, where the second initial parameter is used to represent an initial parameter of a second display feature of a second material corresponding to the second card face pattern, and the second association relationship is used to represent a rule in which a real-time parameter of the second display feature changes with the sensor parameter in the mobile client device.

Figure 4:
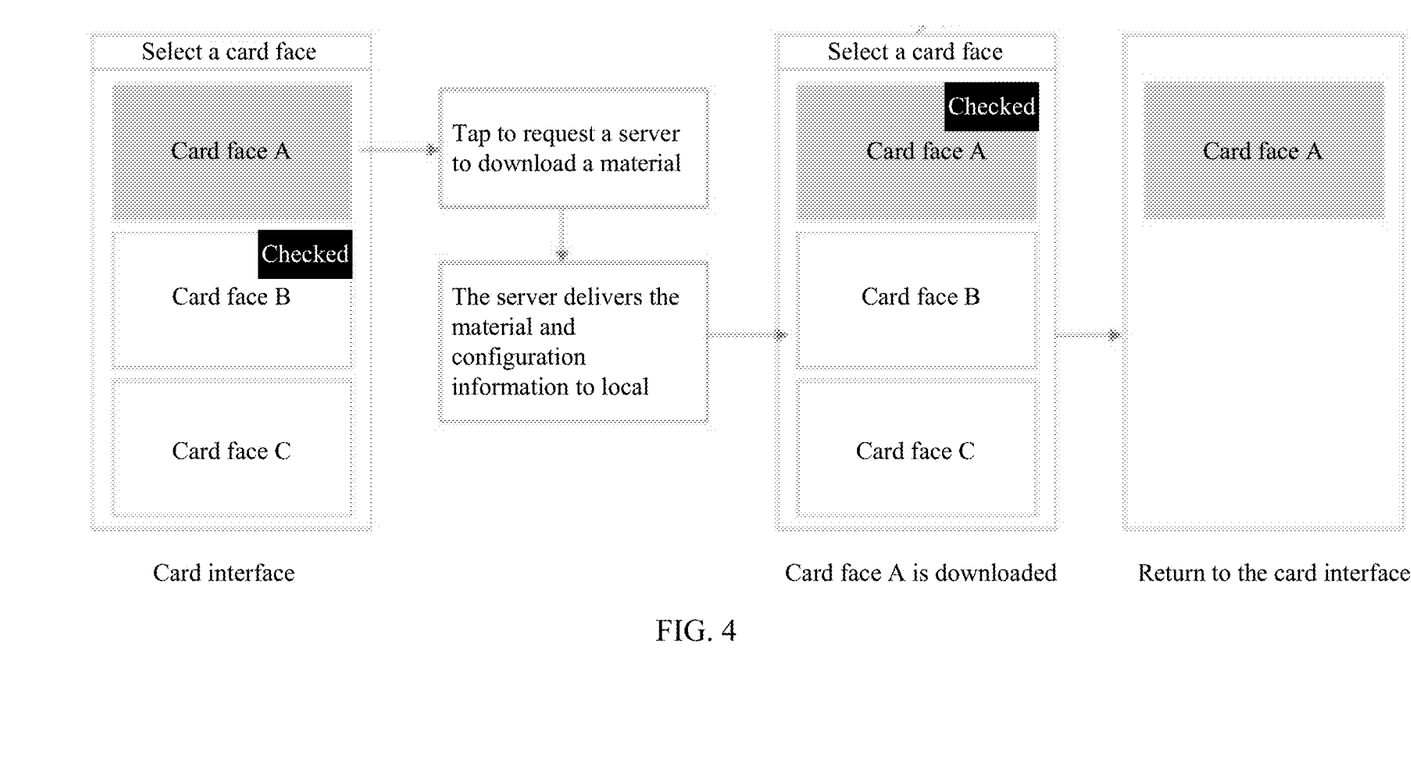
FIG. 4 is a schematic diagram of obtaining related data based on a newly determined card face pattern according to an embodiment of this disclosure.

FIG. 4 is a schematic diagram of obtaining related data based on a newly determined card face pattern according to an embodiment of this disclosure. As shown in FIG. 4, for the determined new card face pattern, namely, the card face A, the mobile client device sends a material download request to the server, and receives material data returned by the server. The material data specifically includes a card face pattern corresponding to the card face A, initial parameters of all materials included in the card face A, and an association relationship between each material in the card face A and the sensor parameter. In this case, on a virtual card interface, the card face pattern related to the card face A is directly displayed, and within a specific time, a corresponding effect of the display feature is presented based on the initial parameters of all the materials included in the card face A. The association relationship between each material in the card face A and the sensor parameter may include a correspondence between a variation range of a display feature of the material and a variation range of at least one sensor parameter.

S800: Collect the sensor parameter in the mobile client device in real time, and determine the real-time parameter of the second display feature based on the sensor parameter and the second association relationship.

This step is similar to step S300. On the basis of obtaining a correspondence between the variation range of the display feature of each material in the card face A and a variation range of a sensor parameter, a linear functional relationship between the display feature and the corresponding sensor parameter may be calculated based on a specific value of a boundary, and a real-time parameter of the display feature may be calculated based on the linear functional relationship.

S900: Display the second material in the virtual card based on the real-time parameter of the second display feature.

In this way, display features of all the materials related to the card face A can change with the sensors in the mobile client device. Therefore, display efficiency and the display effect of the virtual card are improved, and realism of the virtual card is improved. In addition, real-time interaction with the user can be performed, to enhance attractiveness to the user.

Figure 5:
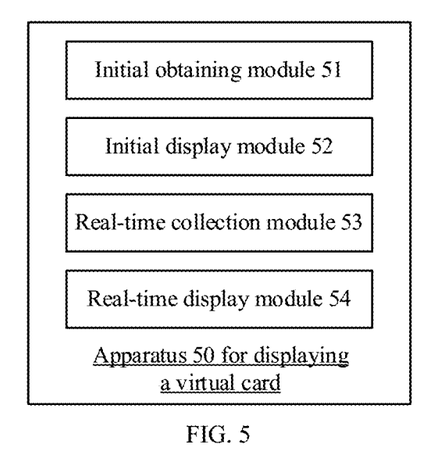
FIG. 5 is a schematic diagram of a program module in an apparatus for displaying a virtual card according to an embodiment of this disclosure.

FIG. 5 shows an apparatus for displaying a virtual card according to an embodiment of this disclosure. The display apparatus is disposed in a mobile client device. In this embodiment, the apparatus 50 for displaying a virtual card may include or be divided into one or more program modules. The one or more program modules are stored in a storage medium and executed by one or more processors to complete this disclosure, and may implement the foregoing method for displaying a virtual card. The program module in this disclosure refers to a series of computer program instruction segments that can perform a specific function, and is more suitable than a program for describing an execution process, in the storage medium, of the apparatus 50 for displaying a virtual card. Functions of the program modules in this embodiment are described below in detail.

An initial obtaining module 51 is configured to obtain a first card face pattern, a first initial parameter, and a first association relationship that correspond to the virtual card and that are selected by a user. The first initial parameter is used to represent an initial parameter of a first display feature of a first material corresponding to the first card face pattern. The first association relationship is used to represent a rule in which a real-time parameter of the first display feature changes with a sensor parameter in the mobile client device.

An initial display module 52 is configured to display the first material in the virtual card based on the first initial parameter.

A real-time collection module 53 is configured to: collect the sensor parameter in the mobile client device in real time, and determine the real-time parameter of the first display feature based on the sensor parameter and the first association relationship.

A real-time display module 54 is configured to display the first material in the virtual card based on the real-time parameter of the first display feature.

Further, the first card face pattern corresponds to a plurality of first materials, and the real-time collection module 53 includes:
  a first collection submodule 531, configured to determine a real-time parameter of a first display feature of each of the plurality of first materials based on the sensor parameter, the first association relationship, and a quantity of the plurality of first materials; or
  a second collection submodule 532, configured to determine a real-time parameter of a first display feature of each of the plurality of first materials based on the sensor parameter, the first association relationship, and attributes of the plurality of first materials.

Further, the display apparatus 50 further includes:
  a change request module 55, configured to send a card face pattern change request to a server;
  a card face determining module 56, configured to: receive a plurality of candidate card face patterns that correspond to the virtual card and that are returned by the server, and determine a second card face pattern from the plurality of candidate card face patterns;
  a second parameter receiving module 57, configured to receive a second initial parameter and a second association relationship that correspond to the second card face pattern and that are returned by the server, where the second initial parameter is used to represent an initial parameter of a second display feature of a second material corresponding to the second card face pattern, and the second association relationship is used to represent a rule in which a real-time parameter of the second display feature changes with the sensor parameter in the mobile client device;
  a second real-time collection module 58, configured to: collect the sensor parameter in the mobile client device in real time, and determine the real-time parameter of the second display feature based on the sensor parameter and the second association relationship; and
  a second real-time display module 59, configured to display the second material in the virtual card based on the real-time parameter of the second display feature.

It should be understood that the modules in the display apparatus 50 shown in FIG. 5 may correspond to the steps in the display method described with reference to FIG. 1. That is, the initial obtaining module 51, the initial display module 52, the real-time collection module 53, and the real-time display module 54 in the display apparatus 50 respectively correspond to steps S100 to S400 in the display method shown in FIG. 1. Therefore, the operations, features, and advantages described above for the display method in FIG. 1 are also applicable to the display apparatus 50 and the modules included in the display apparatus 50. For brevity, some operations, features, and advantages are not described herein.

Figure 6:
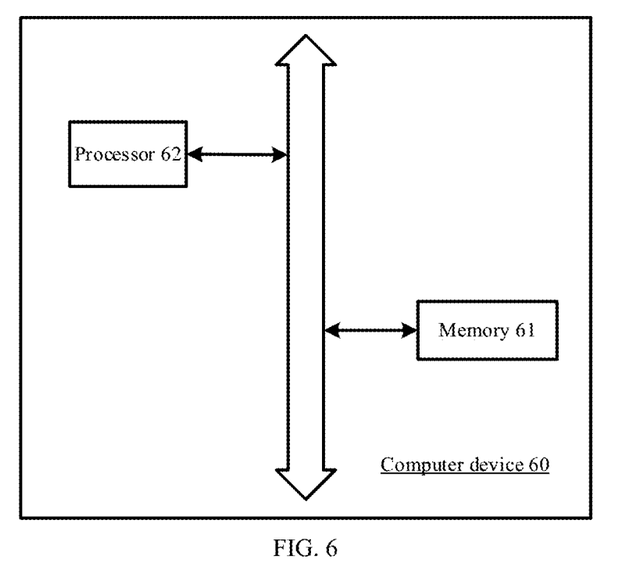
FIG. 6 is a schematic diagram of a hardware structure of a computer device according to an embodiment of this disclosure.

An embodiment further provides a computer device, for example, a smartphone, a tablet computer, a notebook computer, a desktop computer, a rack server, a blade server, a tower server, or a cabinet server (including a standalone server or a server cluster including a plurality of servers) that can execute a program. The computer device 60 in this embodiment includes at least but is not limited to a memory 61 and a processor 62 communicatively connected to each other by using a system bus, as shown in FIG. 6. It should be noted that only the computer device 60 that includes the components 61 and 62 is shown in FIG. 6. However, it should be understood that not all of the shown components need to be implemented, but instead more or fewer components may be implemented.

In this embodiment, the memory 61 (namely, a readable storage medium) includes a flash memory, a hard disk, a multimedia card, a card type memory (for example, SD or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, or the like. In some embodiments, the memory 61 may be an internal storage unit of the computer device 60, for example, a hard disk or memory of the computer device 60. In some other embodiments, the memory 61 may alternatively be an external storage device of the computer device 60, for example, a plug-in hard disk, a smart media card (SMC), a secure digital (SD) card, or a flash card (Flash Card) configured for the computer device 60. Certainly, the memory 61 may include both an internal storage unit of the computer device 60 and an external storage device of the computer device 60. In this embodiment, the memory 61 is usually configured to store an operating system and various types of application software installed in the computer device 60, for example, program code of the apparatus 50 for displaying a virtual card in the foregoing embodiment. In addition, the memory 61 may be further configured to temporarily store various types of data that has been output or is to be output.

In some embodiments, the processor 62 may be a central processing unit (CPU), a controller, a microcontroller, a microprocessor, or another data processing chip. The processor 62 is usually configured to control an overall operation of the computer device 60. In this embodiment, the processor 62 is configured to execute the program code stored in the memory 61 or process data, for example, run the apparatus 50 for displaying a virtual card, to implement the method for displaying a virtual card in the foregoing embodiment.

An embodiment further provides a computer-readable storage medium such as a flash memory, a hard disk, a multimedia card, a card type memory (for example, SD or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, a server, or an application app store. The computer-readable storage medium stores a computer program. When the program is executed by a processor, a corresponding function is implemented. The computer-readable storage medium in this embodiment is configured to store the apparatus 50 for displaying a virtual card. When the computer-readable storage medium is executed by the processor, the method for displaying a virtual card in the foregoing embodiment is implemented.

Figure 7:
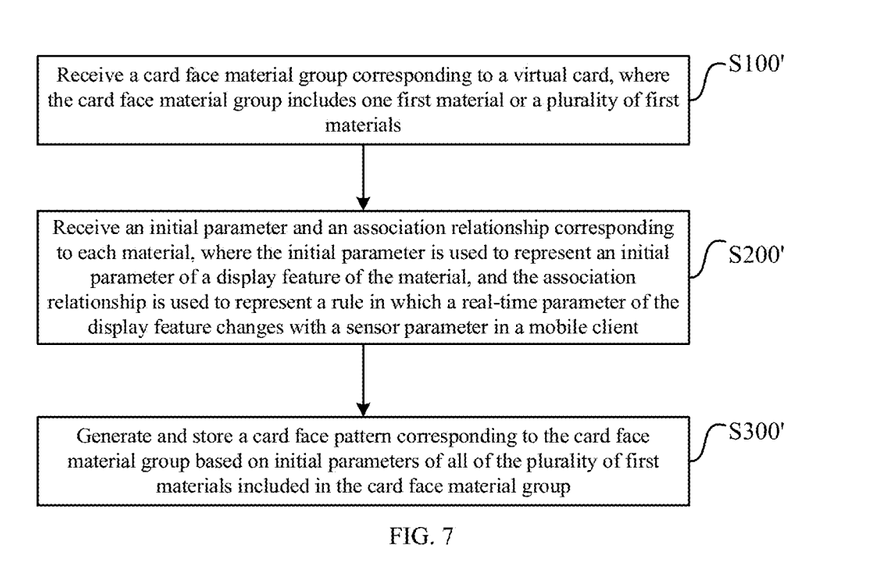
FIG. 7 is a flowchart of a method for displaying a virtual card according to another embodiment of this disclosure.

Referring to FIG. 7, an embodiment provides a method for displaying a virtual card. The method may be performed in a server (in other words, the method is performed by the server or a part of the server), and includes the following steps.

S100': Receive a card face material group corresponding to the virtual card, where the card face material group includes one first material or a plurality of first materials.

The card face material group corresponding to the virtual card may be designed by a designer and then sent to the server for storage. One virtual card may include one or more materials, for example, pictures, videos, or 3D models. Usually, the virtual card includes a rectangular display box. The display box may include one or a combination of several of the foregoing materials such as the pictures, the videos, or the 3D models. Change to different materials or different material combinations is implemented, so that the virtual card can present different content. The different content may be represented by using different card face patterns. It may be understood that the virtual card may include a plurality of different card face patterns for selection by a user based on a preference.

S200': Receive an initial parameter and an association relationship corresponding to each material, where the initial parameter is used to represent an initial parameter of a display feature of the material, and the association relationship is used to represent a rule in which a real-time parameter of the display feature changes with a sensor parameter in a mobile client device.

The initial parameter is used to represent an initial parameter of a display feature of a material corresponding to the card face pattern. When the card face pattern includes a plurality of first materials, for example, includes both a material 1 and a material 2, the initial parameter is an initial parameter of a display feature corresponding to each material, for example, an initial parameter of a display feature corresponding to the material 1 and an initial parameter of a display feature corresponding to the material 2. The display feature in this embodiment may include one or more of position coordinates, a size, transparency, a rotation angle, a flip angle, and a time axis.

An initial parameter of each display feature in this embodiment may be preset by the designer and stored in the server. For example, for a specific material, it is set that initial coordinates are located in a center of a card face area, initial transparency is 0 (in other words, the material is completely opaque), and both an initial rotation angle and an initial flip angle are 0 degrees. The association relationship in this embodiment is used to represent a rule in which a real-time parameter of the display feature changes with the sensor parameter in the mobile client device. It may be understood that the mobile client device such as a smartphone usually includes a plurality of sensors such as an angular velocity sensor, a gravity sensor, a brightness sensor, a barometric pressure sensor, and a geolocation sensor. The rule in which the real-time parameter of the display feature changes with the sensor parameter is set, so that the virtual card can present different display states based on different actions or different environments of the mobile client device, to increase the interactivity and fun. Specifically, a sensor parameter associated with any display feature may be set based on a requirement. Specific examples are as follows:

A correspondence between a variation range of the coordinates and a variation range of an angular velocity sensor parameter or a variation range of a gravity sensor parameter is set.

A correspondence between a variation range of the size and the variation range of the angular velocity sensor parameter, a variation range of a brightness sensor parameter, or the variation range of the gravity sensor parameter is set.

A correspondence between a variation range of the transparency and the variation range of the angular velocity sensor parameter, the variation range of the brightness sensor parameter, the variation range of the gravity sensor parameter, or a variation range of a barometric pressure sensor parameter is set.

A correspondence between a variation range of the rotation angle and the variation range of the gravity sensor parameter is set.

A correspondence between a variation range of the flip angle and the variation range of the angular velocity sensor parameter is set.

A correspondence between a variation range of the time axis and the variation range of the angular velocity sensor parameter is set.

It may be understood by a person of ordinary skill in the art that setting of the foregoing association relationships is merely used as an example, and is not used as a limitation on this disclosure. Any existing or further possible association relationships between the display feature and the sensor shall fall within the protection scope of this disclosure.

S300': Generate and store a card face pattern corresponding to the card face material group based on initial parameters of all of the plurality of first materials included in the card face material group.

The card face pattern may be an image in a format of .jpg, .bmp, or the like, and may be specifically obtained by capturing a screenshot of a virtual card that includes one or more materials, to provide a visual index for the user.

According to some embodiments, the method for displaying a virtual card performed by the server further includes the following steps S500' to S700' (S500' to S700' are not shown in FIG. 7).

S400': Verify an account name and a password in response to an account login request sent by the mobile client device.

This step is used for the user to log in and verify whether the user purchased the virtual card. If the user purchased the virtual card, a corresponding record is stored in the server.

S500': Send a currently selected first card face pattern, a first initial parameter, and a first association relationship to the mobile client device.

At the beginning of logging in to the account by the user, the server may find the first card face pattern last selected by the user, the first initial parameter, and the first association relationship, and send the first card face pattern, the first initial parameter, and the first association relationship to the client.

According to some embodiments, before step 500', the method may further include step S400' (step S400' is not shown in FIG. 7). In step S400', the account name and the password are verified in response to the account login request sent by the mobile client device.

Step S400' is used for the user to log in and verify whether the user purchased the virtual card. If the user purchased the virtual card, a corresponding record is stored in the server. When verification in step S400' succeeds, step S500' is performed.

S600': Send a plurality of candidate card face patterns to the mobile client device in response to a card face pattern change request.

When wanting to change the card face pattern, the user may send the card face pattern change request to the server through the mobile client device. Based on content requested by the mobile client device, the server sends the plurality of candidate card face patterns for selection by the user.

S700': Send, based on a second card face pattern determined by the user from the plurality of candidate card face patterns, a second initial parameter and a second association relationship corresponding to the second card face pattern to the mobile client device.

On the basis of selecting the second card face pattern by the user, the server sends the pre-stored second initial parameter and second association relationship corresponding to the second card face pattern to the mobile client device. The second card face pattern, initial parameters of all materials included in the second card face pattern, and an association relationship between each material in the second card face pattern and the sensor parameter are specifically included.

In this embodiment, all card face patterns, initial parameters, and association relationships corresponding to the virtual card are stored, and a corresponding card face pattern, initial parameter, and association relationship are sent based on a request of the mobile client device. In this way, display features of all the materials included in the virtual card can change with the sensors in the mobile client device. Therefore, display efficiency and a display effect of the virtual card are improved, and realism of the virtual card is improved. In addition, real-time interaction with the user can be performed, to enhance attractiveness to the user.

Figure 8:
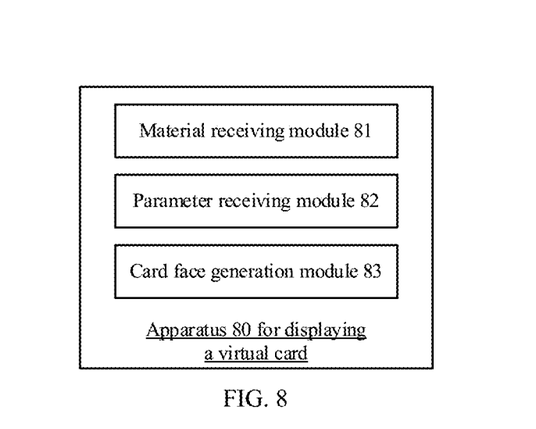
FIG. 8 is a schematic diagram of a program module in an apparatus for displaying a virtual card according to another embodiment of this disclosure.

FIG. 8 shows an apparatus for displaying a virtual card. The display apparatus is disposed in a server. In this embodiment, the apparatus 80 for displaying a virtual card may include or be divided into one or more program modules. The one or more program modules are stored in a storage medium and executed by one or more processors to complete this disclosure, and may implement the foregoing method for displaying a virtual card. The program module in this disclosure refers to a series of computer program instruction segments that can perform a specific function, and is more suitable than a program for describing an execution process, in the storage medium, of the apparatus 80 for displaying a virtual card. Functions of the program modules in this embodiment are described below in detail.

A material receiving module 81 is configured to receive a card face material group corresponding to the virtual card. The card face material group includes one or more materials.

A parameter receiving module 82 is configured to receive an initial parameter and an association relationship corresponding to each material. The initial parameter is used to represent an initial parameter of a display feature of the material. The association relationship is used to represent a rule in which a real-time parameter of the display feature changes with a sensor parameter in a mobile client device.

A card face generation module 83 is configured to generate and store a card face pattern corresponding to the card face material group based on initial parameters of all materials included in the card face material group.

It should be understood that the modules in the display apparatus 80 shown in FIG. 8 may correspond to the steps in the display method described with reference to FIG. 7. That is, the material receiving module 81, the parameter receiving module 82, and the card face generation module 83 in the display apparatus 80 respectively correspond to steps S100' to S300' in the display method shown in FIG. 7. Therefore, the operations, features, and advantages described above for the display method in FIG. 7 are also applicable to the display apparatus 80 and the modules included in the display apparatus 80. For brevity, some operations, features, and advantages are not described herein.

The sequence numbers of the foregoing embodiments of this disclosure are merely for illustrative purposes, and are not intended to indicate priorities of the embodiments.

Any process or method description described in the flowcharts or described herein in another manner may be understood as representing a module, a fragment, or a part of code including one or more executable instructions for implementing steps of a specific logical function or process. In addition, the scope of the preferred implementations of this disclosure includes another implementation in which the order shown or discussed may not be followed. A case in which functions are basically simultaneously performed or performed in a reverse order based on the functions involved is included. This should be understood by a person skilled in the art to which the embodiments of this disclosure pertain.

It may be understood by a person of ordinary skill in the art that all or some of the steps carried in the method in the foregoing embodiments may be implemented by a program by instructing related hardware. The program may be stored in a computer-readable medium. When the program is executed, one or a combination of the steps in the method embodiments is or are included.

In the descriptions of this specification, a reference term such as "an embodiment", "some embodiments", "an example", "a specific example", or "some examples" means that specific features, structures, materials, or characteristics described with reference to the embodiment or example are included in at least one embodiment or example of this disclosure. In this specification, example expressions of the foregoing terms do not necessarily refer to a same embodiment or example. In addition, the described specific features, structures, materials, or characteristics may be combined in a proper manner in any one or more embodiments or examples.

Based on the descriptions of the implementations, it may be clearly understood by a person skilled in the art that the method in the foregoing embodiments may be implemented by software in addition to a necessary universal hardware platform. Certainly, the method may be implemented by hardware. However, in many cases, the former is a preferred implementation.

The foregoing descriptions are merely preferred embodiments of this disclosure, and are not intended to limit the scope of this disclosure. Any equivalent structure or equivalent process transformation made by using the specification and the accompanying drawings of this disclosure or direct or indirect application to other related technical fields falls within the protection cope of this disclosure.

What is claimed is:

1. A method for displaying on a mobile client device a virtual card, wherein the method is implemented by the mobile client device, and the method comprises:
   obtaining, by the mobile client device, from a server, a first card face pattern corresponding to the virtual card, a first initial parameter corresponding to the virtual card, and a first association relationship corresponding to the virtual card, wherein the first initial parameter represents an initial parameter of a first display feature of a first material associated with the first card face pattern, and wherein the first association relationship represents a rule by which a real-time parameter of the first display feature changes in relation to a change to a parameter associated with a first sensor among at least one sensor in the mobile client device;
   displaying on the mobile client device the first material in the virtual card based on the first initial parameter;
   detecting in real time by the mobile client device the change to the parameter associated with the first sensor in the mobile client device;
   determining, by the mobile client device, a change in the real-time parameter of the first display feature based on the first association relationship and the detected change to the parameter associated with the first sensor; and
   displaying on the mobile client device the first material in the virtual card based on the change in the real-time parameter of the first display feature.

2. The method according to claim 1, wherein the first card face pattern is associated with a plurality of first materials, and wherein the method further comprises:
   determining a real-time parameter of the first display feature corresponding to each of the plurality of first materials based on a quantity of the plurality of first materials, the first association relationship, and the parameter associated with the first sensor; or
   determining a real-time parameter of the first display feature corresponding to each of the plurality of first materials based on attributes of the plurality of first materials, the first association relationship, and the parameter associated with the first sensor.

3. The method according to claim 2, wherein the determining the real-time parameter of the first display feature corresponding to each of the plurality of first materials based on the quantity of the plurality of first materials, the first association relationship, and the parameter associated with the first sensor comprises:
   determining a sum of real-time parameters of first display features corresponding to the plurality of first materials based on the first association relationship and the parameter associated with the first sensor; and
   identifying a quotient of the sum of the real-time parameters divided by the quantity of the plurality of first materials as the real-time parameter of the first display feature corresponding to each of the plurality of first materials.

4. The method according to claim 1,
   wherein the first association relationship further represents a rule by which the real-time parameter of the first display feature changes in relation to a change to an attribute of the first material; and
   wherein the attribute of the first material comprises information indicating a background image, a foreground image, or a content category.

5. The method according to claim 1, further comprising:
   sending a request for changing the first card face pattern to a server;
   receiving a plurality of candidate card face patterns that correspond to the virtual card and that are returned by the server, and determining a second card face pattern from the plurality of candidate card face patterns;
   receiving a second initial parameter corresponding to the second card face pattern and a second association relationship corresponding to the second card face pattern that are returned by the server, wherein the second initial parameter represents an initial parameter of a second display feature of a second material associated with the second card face pattern, and the second association relationship represents a rule by which a real-time parameter of the second display feature changes in relation to the change to the parameter associated with the first sensor in the mobile client device;

detecting in real time the parameter associated with the first sensor in the mobile client device, and determining the real-time parameter of the second display feature based on the second association relationship and the parameter associated with the first sensor; and displaying the second material in the virtual card based on the real-time parameter of the second display feature.

6. The method according to claim 1,
wherein the first material comprises a picture, a video, and a three-dimensional (3D) model; and
wherein the first display feature comprises position coordinates, a size, transparency, a rotation angle, a flip angle, and a time axis.

7. The method according to claim 6, wherein the first sensor comprises one or more of an angular velocity sensor, a brightness sensor, a gravity sensor, or a barometric pressure sensor.

8. The method according to claim 7, wherein the first association relationship comprises:
a correspondence between a variation range of the position coordinates and a variation range of a parameter associated with the angular velocity sensor or a variation range of a parameter associated with the gravity sensor;
a correspondence between a variation range of the size and the variation range of the parameter associated with the angular velocity sensor, a variation range of a parameter associated with the brightness sensor, or the variation range of the parameter associated with the gravity sensor;
a correspondence between a variation range of the transparency and the variation range of the parameter associated with the angular velocity sensor, the variation range of the parameter associated with the brightness sensor, the variation range of the parameter associated with the gravity sensor, or a variation range of a parameter associated with the barometric pressure sensor;
a correspondence between a variation range of the rotation angle and the variation range of the parameter associated with the angular velocity sensor;
a correspondence between a variation range of the flip angle and the variation range of the parameter associated with the gravity sensor; and
a correspondence between a variation range of the time axis and the variation range of the parameter associated with the angular velocity sensor.

9. A computer device configured to display a virtual card, the computing device comprising:
a display; a processor; and a memory having stored therein a computer program executable by the processor, wherein upon execution of the computer program by the processor, the processor is configured to carry out operations comprising:
obtaining, from a server, a first card face pattern corresponding to the virtual card, a first initial parameter corresponding to the virtual card, and a first association relationship corresponding to the virtual card, wherein the first initial parameter represents an initial parameter of a first display feature of a first material associated with the first card face pattern, and wherein the first association relationship represents a rule by which a real-time parameter of the first display feature changes in relation to a change to a parameter associated with a first sensor among at least one sensor in the computer device;
displaying on the display the first material in the virtual card based on the first initial parameter;
detecting in real time the change to the parameter associated with the first sensor in the computer device;
determining a change in the real-time parameter of the first display feature based on the first association relationship and the detected change to the parameter associated with the first sensor; and
displaying on the display the first material in the virtual card based on the change in the real-time parameter of the first display feature.

10. The computer device according to claim 9, wherein the first card face pattern is associated with a plurality of first materials, and wherein the determining the real-time parameter of the first display feature based on the first association relationship and the parameter associated with the first sensor comprises:
determining the real-time parameter of the first display feature corresponding to each of the plurality of first materials based on a quantity of the plurality of first materials, the first association relationship, and the parameter associated with the first sensor; or
determining the real-time parameter of the first display feature corresponding to each of the plurality of first materials based on attributes of the plurality of first materials, the first association relationship, and the parameter associated with the first sensor.

11. The computer device according to claim 10, wherein the determining a real-time parameter of a first display feature corresponding to each of the plurality of first materials based on a quantity of the plurality of first materials, the first association relationship, and the parameter associated with the first sensor comprises:
determining a sum of real-time parameters of first display features corresponding to the plurality of first materials based on the first association relationship and the parameter associated with the first sensor; and
identifying a quotient of the sum of the real-time parameters divided by the quantity of the plurality of first materials as the real-time parameter of the first display feature corresponding to each of the plurality of first materials.

12. The computer device according to claim 9,
wherein the first association relationship further represents a rule by which the real-time parameter of the first display feature changes in relation to a change of an attribute of the first material happens; and
wherein the attribute of the first material comprises information indicating a background image, a foreground image, or a content category.

13. The computer device according to claim 9, the operations further comprising:
sending a request for changing the first card face pattern to a server;
receiving a plurality of candidate card face patterns that correspond to the virtual card and that are returned by the server, and determining a second card face pattern from the plurality of candidate card face patterns;
receiving a second initial parameter corresponding to the second card face pattern and a second association relationship corresponding to the second card face pattern that are returned by the server, wherein the second initial parameter represents an initial parameter of a second display feature of a second material associated with the second card face pattern, and the second association relationship represents a rule by which a real-time parameter of the second display feature changes in relation to a the change to the parameter associated with the first sensor in the computer device happens;

detecting in real time the parameter associated with the first sensor in the computer device, and determining the real-time parameter of the second display feature based on the second association relationship and the parameter associated with the first sensor; and displaying on the display the second material in the virtual card based on the real-time parameter of the second display feature.

14. The computer device according to claim 9, wherein the first material comprises at least one of a picture, a video, or a three-dimensional (3D) model; and wherein the first display feature comprises at least one of position coordinates, a size, transparency, a rotation angle, a flip angle, or a time axis.

15. The computer device according to claim 9, wherein the first sensor comprises one of an angular velocity sensor, a brightness sensor, a gravity sensor, or a barometric pressure sensor.

16. The computer device according to claim 9, wherein the first display feature comprises position coordinates, a size, transparency, a rotation angle, a flip angle, and a time axis;

wherein the at least one sensor comprises one or more of an angular velocity sensor, a brightness sensor, a gravity sensor, or a barometric pressure sensor;

wherein the first association relationship comprises:

a correspondence between a variation range of the position coordinates and a variation range of a parameter associated with the angular velocity sensor or a variation range of a parameter associated with the gravity sensor, a correspondence between a variation range of the size and the variation range of the parameter associated with the angular velocity sensor, a variation range of a parameter associated with the brightness sensor, or the variation range of the parameter associated with the gravity sensor, a correspondence between a variation range of the transparency and the variation range of the parameter associated with the angular velocity sensor, the variation range of the parameter associated with the brightness sensor, the variation range of the parameter associated with the gravity sensor, or a variation range of a parameter associated with the barometric pressure sensor, a correspondence between a variation range of the rotation angle and the variation range of the parameter associated with the angular velocity sensor, a correspondence between a variation range of the flip angle and the variation range of the parameter associated with the gravity sensor, and a correspondence between a variation range of the time axis and the variation range of the parameter associated with the angular velocity sensor.

17. A non-transitory computer-readable storage medium, storing a computer program, wherein the computer program, upon execution by a mobile device, causes the mobile device to implement operations comprising:

obtaining, by the mobile device, from a server, a first card face pattern corresponding to a virtual card, a first initial parameter corresponding to the virtual card, and a first association relationship corresponding to the virtual card, wherein the first initial parameter represents an initial parameter of a first display feature of a first material associated with the first card face pattern, and wherein the first association relationship represents a rule by which a real-time parameter of the first display feature changes in relation to a change to a parameter associated with first sensor in the mobile device;

displaying on the mobile device the first material in the virtual card based on the first initial parameter;

detecting in real time by the mobile device the change to the parameter associated with the first sensor in the mobile device;

determining, by the mobile device, a change in the real-time parameter of the first display feature based on the first association relationship and the detected change to the parameter associated with the first sensor; and displaying on the mobile device the first material in the virtual card based on the change in the real-time parameter of the first display feature.

18. The non-transitory computer-readable storage medium according to claim 17, wherein the first material comprises at least one of a picture, a video, or a three-dimensional (3D) model;

wherein the first association relationship further represents a rule by which the real-time parameter of the first display feature changes as a change of an attribute of the first material happens; and wherein the attribute of the first material comprises information indicating a background image, a foreground image, or a content category.

19. The non-transitory computer-readable medium according to claim 17, wherein the first display feature comprises position coordinates, a size, transparency, a rotation angle, a flip angle, and a time axis; and wherein the at least one sensor comprises one or more of an angular velocity sensor, a brightness sensor, a gravity sensor, or a barometric pressure sensor.

20. The non-transitory computer-readable storage medium according to claim 19, wherein the first association relationship comprises:

a correspondence between a variation range of the position coordinates and a variation range of a parameter associated with the angular velocity sensor or a variation range of a parameter associated with the gravity sensor;

a correspondence between a variation range of the size and the variation range of the parameter associated with the angular velocity sensor, a variation range of a parameter associated with the brightness sensor, or the variation range of the parameter associated with the gravity sensor;

a correspondence between a variation range of the transparency and the variation range of the parameter associated with the angular velocity sensor, the variation range of the parameter associated with the brightness sensor, the variation range of the parameter associated with the gravity sensor, or a variation range of a parameter associated with the barometric pressure sensor;

a correspondence between a variation range of the rotation angle and the variation range of the parameter associated with the angular velocity sensor;
a correspondence between a variation range of the flip angle and the variation range of the parameter associated with the gravity sensor; and
a correspondence between a variation range of the time axis and the variation range of the parameter associated with the angular velocity sensor.

* * * * *